United States Patent [19]

Everhart

[11] Patent Number: 4,475,238
[45] Date of Patent: Oct. 2, 1984

[54] MAGNETORESISTIVE IMAGE CORRELATION DEVICE

[76] Inventor: Glenn C. Everhart, 409 High St., Mount Holly, N.J. 18060

[21] Appl. No.: 365,815

[22] Filed: Apr. 5, 1982

[51] Int. Cl.³ .............................................. G06K 9/64
[52] U.S. Cl. ..................................... 382/34; 364/823; 365/8; 365/158; 382/42; 382/64
[58] Field of Search ............... 364/728, 819–823; 365/8, 33, 48, 50, 158; 369/146; 382/32–34, 42, 64; 356/390, 394, 388; 343/5 MM

[56] References Cited

U.S. PATENT DOCUMENTS

| | | | |
|---|---|---|---|
| 3,221,301 | 11/1965 | Moyroud | 382/32 |
| 3,310,665 | 3/1967 | Schimmel | 364/823 |
| 3,459,928 | 8/1969 | Lerwill et al. | 364/823 |
| 3,459,929 | 8/1969 | Lerwill et al. | 364/823 |
| 3,804,519 | 4/1974 | Outeru et al. | 382/64 |
| 3,975,710 | 8/1976 | Watanabe et al. | 382/64 |
| 4,209,759 | 6/1980 | Volluet | 364/823 |
| 4,246,474 | 1/1981 | Lazzari | 365/158 |

Primary Examiner—Leo H. Boudreau
Attorney, Agent, or Firm—Caesar, Rivise, Bernstein & Cohen, Ltd.

[57] ABSTRACT

An image correlation device utilizing the principle of magnetoresistance. A sensed image is compared to a preselected mask image to determine whether the two images match. The comparison is accomplished by electrically representing the sensed image along a first surface and the mask image along a second surface of magnetoresistive member or body of material (a magnetoresistive member is one which demonstrates a greater amount of electrical resistance transverse to a magnetic field to which the member is exposed than it does parallel to that field). Where the two images match such that there is a maximum number of corresponding points along these surfaces a maximum amount of current flows through the body. Moreover, matching images can be compared and a match recognized even where the images are at different positions along their respective top and bottom surfaces of the magnetoresistive block. This is accomplished by means of shifting the magnetic field to in effect shift the direction of the paths having the least amount of electrical resistance through the block. The device may also include a second magnetoresistive body so that both the object and the background can simultaneously by compared to preclude a match signal from occuring where one image has all the features of the second image along with some additional features not found in the second image.

11 Claims, 8 Drawing Figures

FIG. 6

MAGNETORESISTIVE IMAGE CORRELATION DEVICE

BACKGROUND OF THE INVENTION

This invention relates generally to image correlators and more particularly to a magnetic resistance image correlation device.

The property of magnetic resistance (referred to hereinafter as magnetoresistance) has been known for a great number of years. It relates to the fact that the electrical resistance of certain materials is greater in a direction transverse to a magnetic field to which the material is exposed than it is in a direction parallel to the magnetic field. When a magnetoresistive material is exposed to a magnetic field, it offers the least amount of electrical resistance along a path which is parallel to the magnetic field and offers increasingly greater resistance as that path is rotated away from the direction of the magnetic field. To that end, the greatest amount of electrical resistance through the material is along a path perpendicular to the direction of the magnetic field.

Correlation devices have a wide variety of present usages and an even greater number of potential future ones. Electronic correlation devices provide an electronic means for determining whether an electronically perceived external object matches (looks the same as) a given known object. To that end, electronic correlation devices also provide a means for providing input data to a computer or for generating a signal for actuating some other electronic or electromechical system in response to the occurrence or non-occurrence of the selected object.

A few examples of systems which either use or could use correlation devices include radar detection systems for spotting enemy aircraft, missiles, etc., character recognition systems which interface with a computer, transportation systems for preventing collisions between a vehicle and another vehicle, a particular object or a person, surveillance systems and verification systems.

With regard to all of the abovementioned usages, a most important feature of the correlation device is that the device be able to scan a visual field to determine whether the object being looked for is present even when the object is not situated to be at a predetermined location within the visual field.

OBJECTS OF THE INVENTION

Accordingly, it is a general object of the instant invention to provide a correlation device which compares a sensed image with a preselected "mask" image to determine the degree of similarity between the two.

It is a further object of the instant invention to provide a correlation device which utilizes the property of magnetoresistance in comparing a sensed image with a preselected mask image.

It is still a further object of the instant invention to provide an electronic image correlation device which utilizes the property of magnetoresistance by shifting a magnetic field in order to determine whether there is a matching randomly positioned sensed image present anywhere within a pre-established visual field.

SUMMARY OF THE INVENTION

These and other objects of the instant invention are achieved by providing a magnetoresistive image correlation device. The device comprises a body formed of a magnetoresistive material having a first surface and a second surface, such that when the body is exposed to a magnetic field the electrical resistance through the body is substantially greater in the direction perpendicular to the field than it is in the direction parallel to the field. The device also includes means for engaging and supplying an electrical current to a plurality of points situated along the first surface of the member such that the number and location of these points correspond to a particular first image and means for electrically engaging a plurality of points along the second surface of the member to the opposite electrical pole of the source of current such that the number and location of these points correspond to a second image. In that regard, the total current flowing through the magnetoresistive member is dependent upon the number of electrically engaged points on the first surface which are situated to have correspondingly located electrically engaged points on the second surface. Moreover, the device includes indicator means which is responsive to the amount of current flowing through the magnetoresistive member.

DESCRIPTION OF THE DRAWING

Other objects and many of the attendant advantages of the invention will become readily appreciated as the same becomes better understood by reference to the following detailed description when considered in connection with the accompanying drawing wherein.

DETAILED DESCRIPTION OF PREFERRED EMBODIMENT

Figure 1:
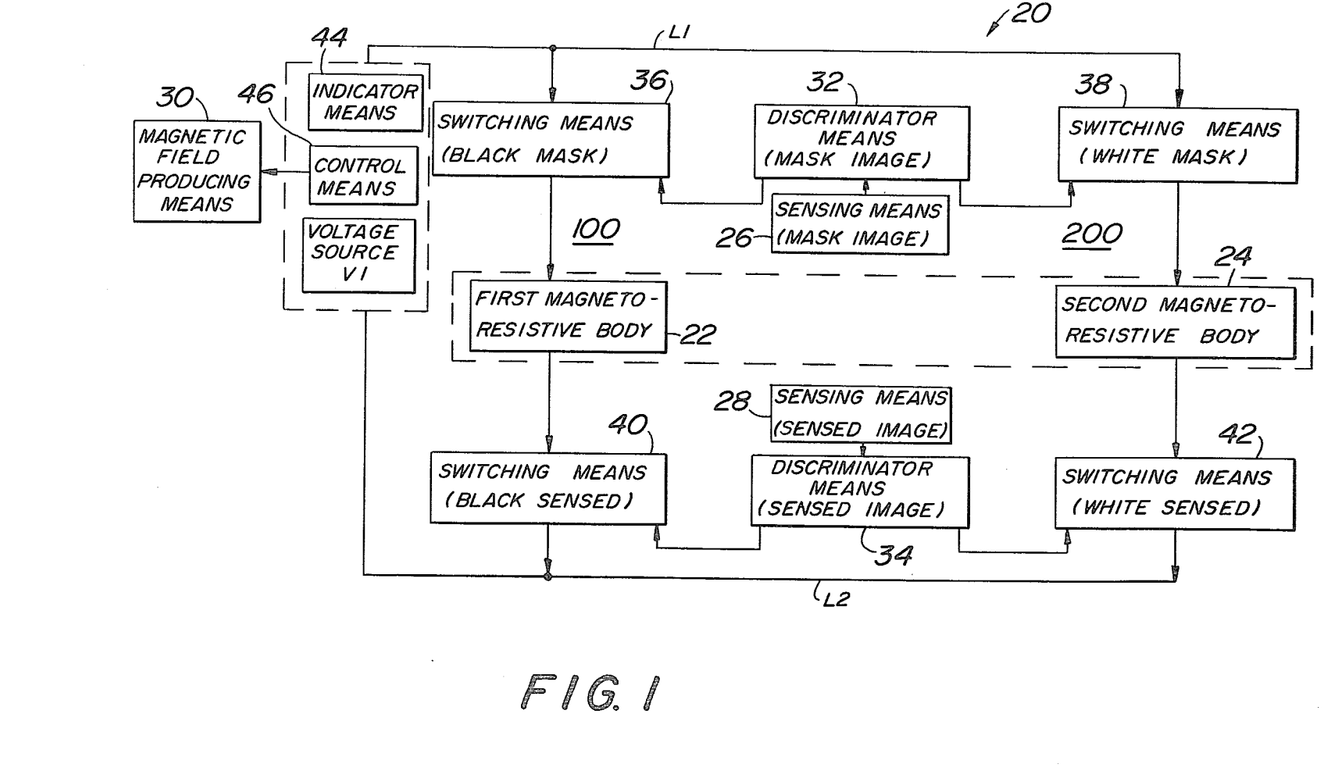
FIG. 1 is a functional block diagram of a magnetoresistive image correlation system constructed in accordance with this invention.

Referring now to the various figures of the drawing wherein like reference characters refer to like parts, there is shown at 20 in FIG. 1 a functional block diagram of a magnetoresistive image correlation device constructed in accordance with the instant invention.

It should be pointed out that the device 20 as shown and otherwise disclosed in the foregoing application is merely exemplary of an operative image correlation device which can be constructed utilizing the property of magnetoresistance. It is of course understood that a commercial embodiment of the device 20 would necessarily include additional conventional components whose use and inclusion within the device is well within the skill in the art.

The device 20 is arranged to indicate whether an externally sensed image matches a particular "mask" image.

For purposes of the foregoing discussion, the word "match" shall be used not only to refer to situations where there is an exact match between two images but also to situations where there is a high degree of similarity between the two.

The device 20, through the utilization of the principle of magnetoresistance, scans or searches an external visual field for a randomly positioned sensed image which matches the mask image.

As shown in FIG. 1, the device 20 basically comprises two cubical bodies 22 and 24 constructed of a magnetoresistive material, first and second sensing means 26 and 28, respectively, means for producing a magnetic field 30, first and second discriminator means 32 and 34, respectively, four sets of switching means 36, 38, 40 and 42, respectively, indicator means 44 and control means 46.

The device 20 is arranged to determine whether or not an externally sensed image matches a mask image. In FIG. 2C there is a pictorial representation of an image 50 which matches the mask image 52 and a pictorial respresentation of an image 48 which does not match the mask image.

To that end, the device 20 is constructed to utilize two parallelly connected correlation-performing circuits, namely, the "black" image circuit 100 and the "white" image circuit 200.

Figure 4:
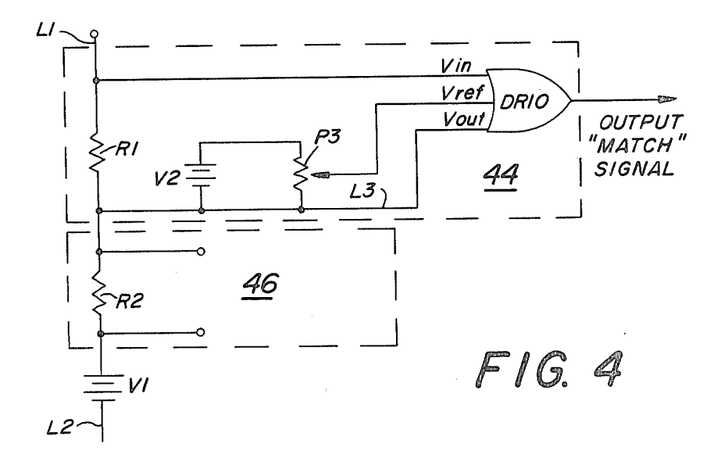
FIG. 4 is a schematic diagram of means shown within the broken line box in FIG. 1.

The "black" image circuit 100 comprises the series connection of switching means 36, the body 22 and the switching means 40. The "white" image circuit 200 comprises the series connection of switching means 38, the body 24 and the switching means 42. One side of each of the parallel circuits 100 and 200 is connected to one electrical line L1. In a similar manner the other side of each of the parallel circuits is connected to another identical line L2. The lines L1 and L2 form a circuit pathof the device 20. A voltage source V1, such as a battery, the control means 46 and the indicator means 44 are connected in said circuit path as shown in FIG. 4.

The "black" image circuit 100 compares the "black" features of the sensed image with the "black" features of the mask image while the "white" image circuit 200 performs a similar comparision with regard to the "white" features. The necessity for performing a dual comparison or correlation pertains to the fact that if only the "black" features (i.e., the features corresponding to the object) were compared, a sensed object having all the features of the mask image along with additional non-matching black features would nonetheless be mistakenly recognized as a matching image. In this situation, the sensed image would have fewer "white" image features (i.e., features corresponding to the background) than the mask image would have and as a result, there would be fewer white sensed image features corresponding to white mask image features. Thus, although the black image circuit would respond as though it had sensed a match, the white image circuit would not. Since the white image circuit and the black image circuit are connected in parallel, the net result is that less than a maximum amount of current would flow through lines L1, L2 and the indicator means 44, thus indicating that a match has not occurred.

It should thus be appreciated that when the sensed image and the mask image indeed match, not only do the black mask image features correspond with the black sensed image feature but all the white mask image features also correspond with all the white sensed image features, as well. In that regard, whenever there is in fact a match, the sum of the number of matching white image features and the number of matching black image features is maximized.

The comparison between the mask image and the sensed image is accomplished by means of the first (mask image) sensing means 26 responding to the presence of a particular mask image 52 by producing a plurality of electrical signals for receipt by the first (mask image) discriminator means 32. The discriminator means 32 in response thereto produces a plurality of signals to be received by the first and second (black mask image and white mask image) switching means 36 and 38, respectively. Likewise, the second (sensed image) sensing means 28 responds to its having sensed an external image either 48 or 50 by producing signals to be received by the second (sensed image) discriminator means 34. The sensed image discriminator means 34 then produces a series of signals which are received by the third and fourth (black sensed image and white sensed image) switching means 40 and 42, respectively. The black mask image switching means 36 and the black sensed image switching means 40 are interconnected by means of the first (black image) magnetoresistive body 22. Similarly the white mask image switching means 38 and white sensed image switching means 42, are interconnected by means of the second (white image) magnetoresistive body 24.

As shall be discussed in greater detail below, these interconnections provide a means for enabling the instant invention to compare images. The control means 46 operates to shift the electrical representation of the mask image along the top surfaces of the bodies 22 and 24 to obtain the best possible match between it and a sensed image being represented electronically along the bottom surface 68. This is accomplished by means of shifting the direction of the magnetic field produced by the magnetic field producing means 30. When there is a match between the mask image 52 and a sensed image 50, a maximum amount of combined electrical current flows through the first and second magnetoresistive bodies 22 and 24 and hence the path composed of lines L1, L2 and the indicator means. The indicator means 44, thus, produces a signal to indicate that a match has occurred. The operation of the indicator means is controlled by the control means 46. That means serves to establish the threshold current value of the indicator indicative of a matched condition.

Figure 2A:
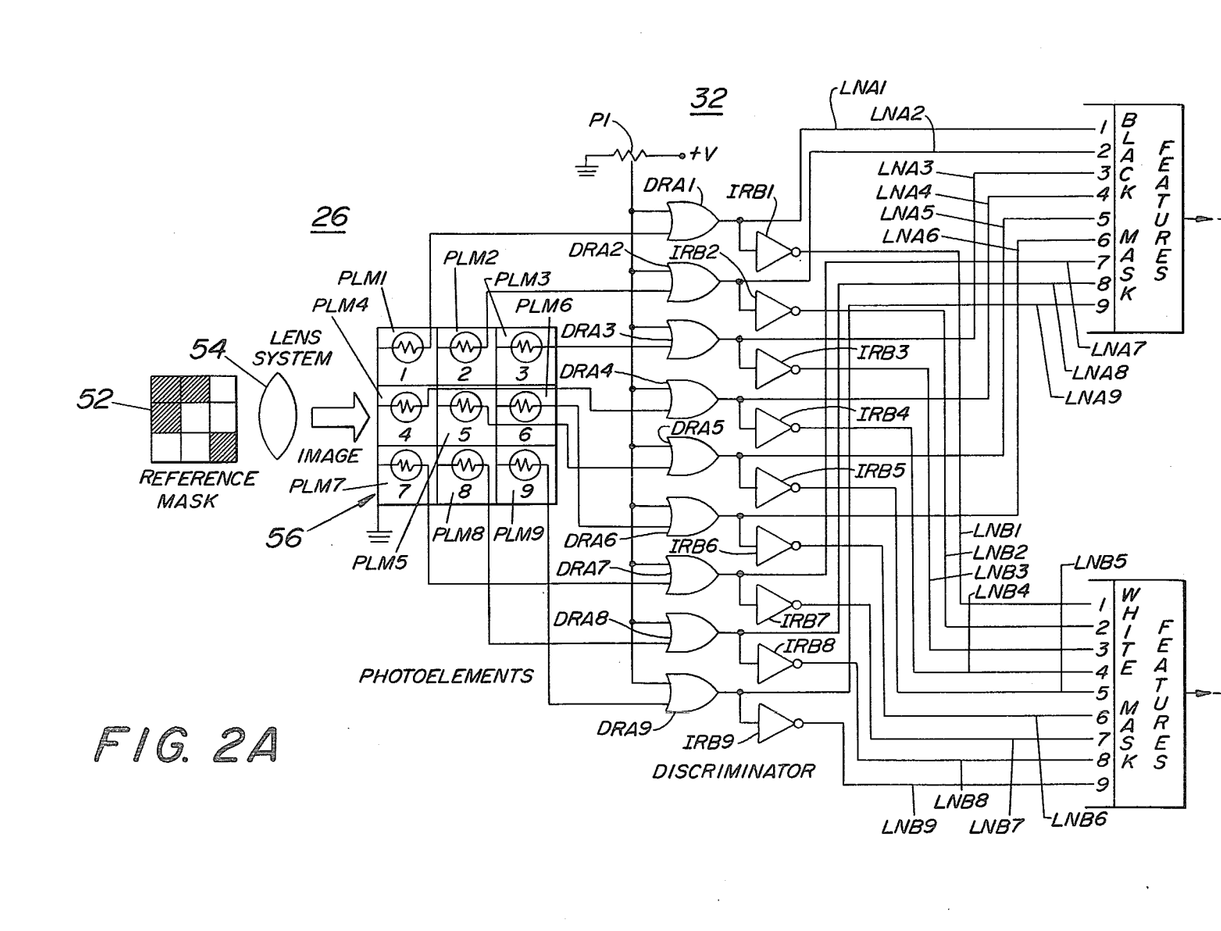
FIGS. 2A, 2B and 2C, together form a schematic diagram of a portion of the system shown in FIG. 1.

As shown in FIG. 2A, the mask image sensing means 26 senses and converts a mask image into a plurality of electrical signals. The mask image sensing means 26 basically comprises a template or reference mask 52, a lens system 54 and receptor means 56. A conventional lens system 54 is utilized to focus the mask image as drawn on the template 52 upon the receptor means 56. The receptor means 56, which includes a grid-like array of photoelements PLM1–PLM9, produces a plurality of electrical signals, with each signal corresponding to the portion of the image which is focused on a particular photoelement. The electrical signals produced by the receptor means 56 are received by the mask image discriminator means 32.

The switching means 36, 38, 40 and 42 each consist of plural controlled switch elements. For example, switching means 36 includes switch elements SW1A–SW9A, switching means 38 includes elements SW1B–SW9B, means 40 includes elements SW1C–SW9C and means 42 includes elements SW1D–SW9D.

The mask image discriminator means 32 includes a plurality of discriminators or gates DRA1–DRA9 and a plurality of inverters IRB1–IRB9. Each discrimintor of DRA1–DRA9 includes two input pins and one output pin. The output pin of each discriminator is connected to the junction between a particular inverter of IRB-1–IRB9 and a particular switch SW1A–SW9A of the black mask image switching means 36. The output pin of each discriminator/inverter pair is connected through the first input pin of the particular discriminator DRA1–DRA9 to a particular corresponding photoelement PLM1–PLM9 of the mask image receptor means 56.

The second input pin of each discriminator DRA1–DRA9 is connected to the center tap connection of a potentiometer P1. The two ends of potentiometer P1 are connected to a positive voltage source and a common grounds, respectively. Since each discriminator DRA1–DRA9 is also connected to the same common ground, potentiometer P1 provides a positive biasing voltage for each discriminator.

Each discriminator DRA1–DRA9 produces a "1" state signal whenever the signal it receives from its respective photoelement PLM1–PLM9 is of a greater voltage than the biasing voltage produced by potentiometer P1. If the signal received from a particular photoelement is of a lower voltage than the voltage across the center tap of the potentiometer P1, the particular discriminator produces a "0" state output signal.

Figure 6:
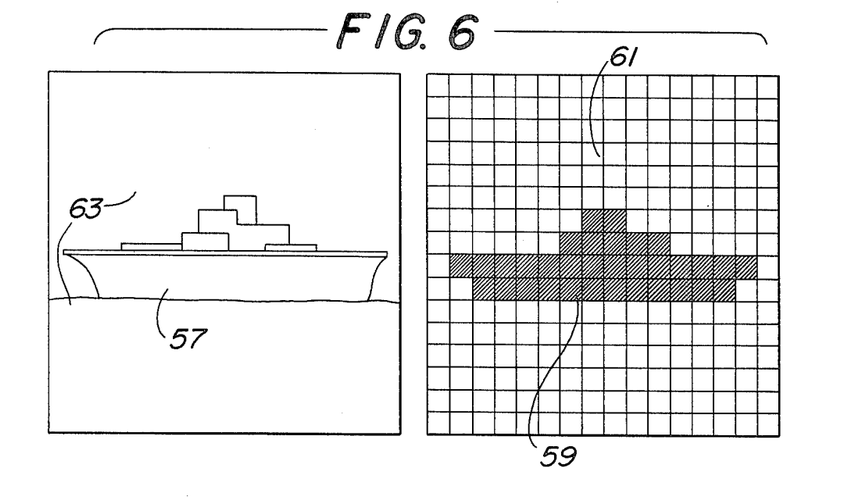
FIG. 6 is an illustration of how the receptor means of the subject invention would perceive an external object, such as a ship on the horizon.

As shown in FIG. 6, the image of a ship 57 at sea either drawn on the mask image template or externally sensed by the sensed image sensing means 28, is perceived by the respective receptor means 56 or 58 as a plurality of black 59 and white 61 pixels (picture elements) on a two-dimensional grid. Each black pixel 59 (which represents a portion of the ship 57) corresponds to a photoelement which is producing a signal having a greater voltage than the threshold biasing voltage and each white square 61 (which represents a portion of the background 63) corresponds to a photoelement which is not producing a signal having a greater voltage than the threshold biasing voltage. Whether it is the background which is to be designated as white and the object as black or vice versa is purely arbitrary. Nevertheless, for purposes of the foregoing discussion, the primary object shall be deemed the black image and the background shall be deemed the white one.

In order to obtain the degree of resolution shown in FIG. 6 it is necessary to utilize receptor means 56 or 58 comprising 256 photoelements as opposed to only nine as are shown in the other Figures of the drawing. Thus, although only nine photoelements are shown in the drawing, it should be understood that the drawing is merely exemplary of how the device operates. A practical embodiment of the invention would, depending upon the resolution desired, entail discriminator means comprising many more components than shown herein.

Each inverter IRB1–IRB9 produces a "1" signal whenever the output of its paired discriminator DRA1–DRA9 is in the "0" state and a "0" state signal whenever its paired discriminator is producing a "1" output signal. Thus, as should be obvious, in all situations for each discriminator/inverter pair, either the discriminator DRA1–DRA9 is producing a "1" state output signal and its paired inverter is producing a "0" state output signal or the inverter IRB1–IRB9 is producing a "1" state output signal and its paired discriminator is producing a "0" state output signal.

Figure 2B:
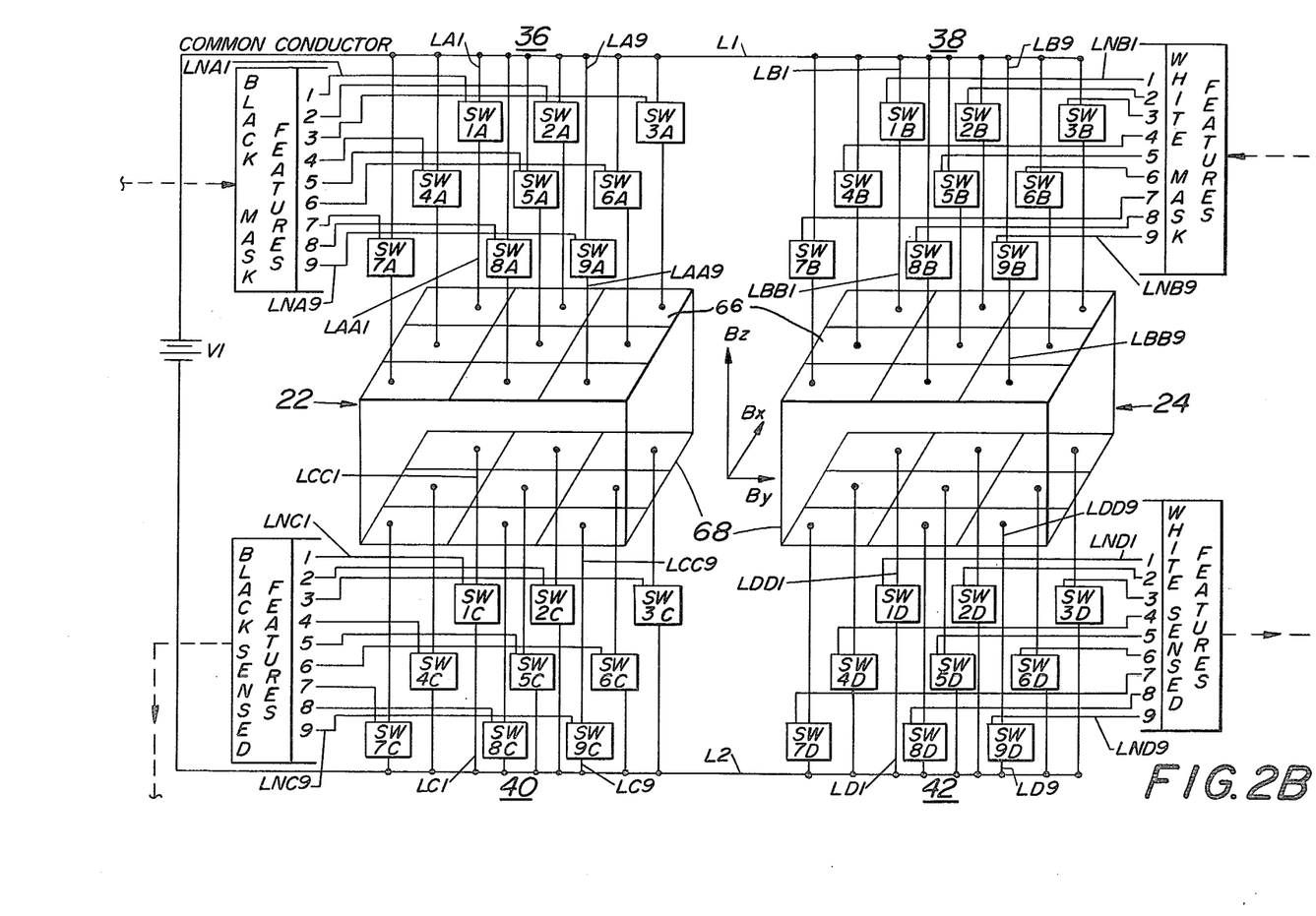
Figure 2C:
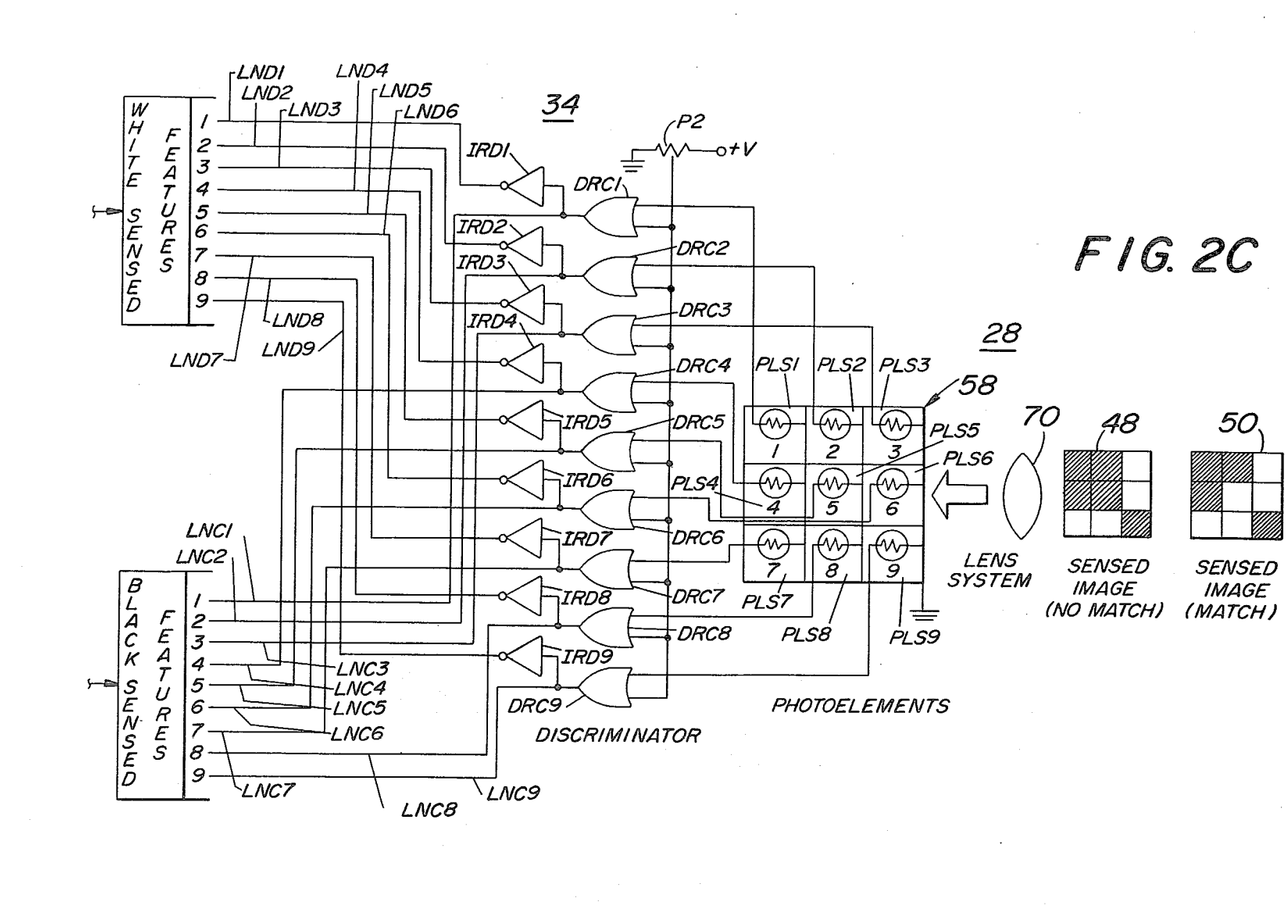

In addition to being connected to a plurality of inverters IRB1–IRB9, the output pins of the mask image discriminators DRA1–DRA9 are also connected to the black mask switching means 36 (shown in FIG. 2B). The output pins of the mask image inverters IRB1–IRB9 are connected to the white mask image switching means 38 (as shown in FIG. 2B). Thus, from the foregoing discussion it can be appreciated that when a black mask image is sensed by the receptor means 56, the photoelements PLM1–PLM9 which are positioned adjacent the black mask image, produce signals in excess of the threshold of the discriminator. These signals are received by discriminators DRA1–DRA9 which in turn convert these signals into a plurality of "1" signals to indicate that a black mask image has been detected at these various locations. Moreover, the paired inverters produce a plurality of "0" state signals to indicate the absence of a white mask image at these locations. With regard to all positions corresponding to the background, photoelements PLM1–9 produce a plurality of voltage signals below the threshold of the associated discriminators DRA1–DRA9. Thus, the associated discriminators produce "0" output signals to indicate the absence of a black mask image at these various positions. Similarly, the paired inverters IRB1–IRB9 then produce "1" state signals to indicate the presense of a white mask image at these particular locations.

Referring to FIG. 2B, and as mentioned above, each mask image discriminator DRA1–DRA9 output pin is connected to a particular switch SW1A–SW9A comprising the black mask image switching means 36. Thus, switch SW1A is connected to the discriminator DRA1 which in turn is connected to photoelement PLM1, switch SW2A is connected to the discriminator DRA2 which in turn is connected to photoelement PLM2 and so on.

Similarly, each mask image inverter IRB1–IRB9 is connected to a corresponding switch of the white mask image switching means 38. For example, the inverter IRB1 which is connected to photoelement PLM1 through its paired discriminator DRA1, is in turn connected to switch SW1A of the white mask image switching means 38, the inverter IRB2 which is connected through its paired discriminator DRA2 to photoelement PLM2 is connected at its output to switch SW2B of the white mask switching means 38, and so on.

The switching means can comprise any solid state device (e.g., an optical isolator, such as the one shown in FIG. 3) having a control input for opening and closing a path between its poles.

Whenever the gate of a particular switch of the black mask image switching means 36 receives a "1" state signal from its corresponding discriminator, the switch assumes a closed state of operation and allows current to flow between its poles. Thus, in such a case current flows into the body from that switch. Conversely, whenever a "0" state signal is received from the corresponding discriminator DRA1–DRA9, the switch assumes an open state of operation, preventing the flow of current between its poles.

Likewise, whenever a switch SW1B–SW9B of the white mask switching means receives a "1" state signal from its corresponding inverter IRB1–IRB9 it assumes a closed state of operation and whenever a switch SW1B–SW9B receives a "0" state signal from the output of its corresponding inverter IRB1–IRB9 it assumes an open state of operation.

Each switch SW1A–SW9A of the black mask image switching means 36 is connected at one pole, through a respective electrical conductor LA1–LA9, to the common conductor L1 and at its other pole, through a respective electrical conductor LAA1–LAA9, to a point along the top surface of the first (black image) magnetoresistive body 22. Thus, these switches operate to control the flow of current between the body and line L1. Similarly, each switch SW1B–SW9B of the white mask image switching means 38 is connected at one pole, through a respective electrical conductor LB1–LB9, to a common conductor L1 and at its other pole, through a respective electrical conductor LBB1–LBB9 to a point along the top surface 66 of the second (white image) magnetoresistive body 24. Thus, these switches operate to control the flow of current between the second body 24 and line L1.

All of the above mentioned connections to the magnetoresistive bodies 22 and 24 are made such that the points of connection form a pattern along these top surfaces 66 corresponding to the grid like pattern or array in which the photoelements PLM1–PLM9 are arranged.

Therefore, each point along the top surface of the body 22 which is connected by a closed switch SW1A–SW9A to the common conductor L1 corresponds to a photoelement PLM1–PLM9 which has sensed a black image at its position and each point along the top surfaces 66 of the body 22 which is electrically isolated by an open switch SW1A–SW9A corresponds to a photoelement PLM1–PLM9 of the receptor means 56 which at its position has sensed a white mask image (i.e., the absence of a black mask image).

For example, referring to FIG. 2A it can be seen that the reference mask 52 comprises black images at points which correspond to photoelements PLM1, PLM2, PLM4, and PLM9 and white images at points which correspond to photoelements PLM3, PLM5, PLM6, PLM7 and PLM8. Thus, the receptor means 56 causes the mask image discriminator DRA1, DRA2, DRA4, and DRA9 to produce a "1" state signal which in turn causes the black mask image switches SW1A, SW2A, SW4A, and SW9A to be closed and the black mask image switches SW3A, SW5A, SW6A, SW7A and SW8A, to be open.

Furthermore, the inverters IRB1, IRB2, IRB4 and IRB9 are in a "0" state of operation while inverters IRB3, IRB5, IRB6, IRB7 and IRB8 assume a "1" state of operation. Therefore switches SW1B, SW2B, SW4B, and SW9B of the white mask image switching means 38 are "open" and switches SW3B, SW5B, SW6B, SW7B and SW8B of the white mask image switching means 38 are "closed".

As can be seen from FIG. 2C, the sensed image portion of the device 20 also includes sensing means 28, discriminator means 34 and switching means 40 and 42.

The sensed image sensing means 28 includes a lens system 70 designed to project an externally sensed image 48 to 50 onto an array of photoelements comprising the sensed image receptor means 58. (The receptor means 58 being identical to the receptor means 56 utilized for the mask image switching means 26). Likewise, these receptor means 58 are connected to identical discriminator and inverter circuits in an identical manner as are the mask image discriminator means 32. Moreover, the sensed image discriminator means 34 are connected to a positive source of voltage which in this case is produced by the center tap connection of a second potentiometer P2.

The sensed image discriminator means 34 are connected to both the black sensed image switching means 40 and the white sensed image switching means 42 in a manner identical to the manner in which the mask image discriminator means 32 are connected to the black mask image switching means 36 and white mask image switching means 38.

For example, switch SW1C of the black sensed image switching means 40 is connected to the output of discriminator DRC1 of the sensed image discriminator means 34 which in turn is connected to photoelement PLS1 of the sensed image receptor means 58. The inverters IRD1–IRD9 comprising a portion of the sensed image discriminator means 34 are arranged with the input to each inverter being connected to the output of an associated discriminator. For example the output of DRC1 is connected to the input of inverter IRD1. The input of DRC1 is connected to photoelement PLS1 of the sensed image sensing means 28. The output of inverter IRD1 is connected to the switch SW1D of the white sensed image switching means 42 via a line LND1. The output of the discriminator DRC1 (which has a complementary signal to the output of inverter IRD1) is connected via a line LNC1 to the switch SW1C of the black image switching means 40. Each of the other discriminators and inverters of means 34 is similarly connected.

Thus, the sensing means 28, the discriminator means 34 and the switching means 40 and 42 are interconnected to form the sensed image portion of the device in the same manner as these respective members are interconnected to form the mask image portion of the device 20.

The black sensed image switching means 40 are connected to points along the bottom surface 68 of the first (black image) magnetoresistive body 22 and the white sensed image switching means 42 are connected to points along the bottom surface 68 of the second (white image) magnetoresistive body 24 in the same manner as described heretofore with reference to body 22.

In this regard, points of connection along the top surfaces 66 correspond to points of connection along the bottom surfaces 68 of the magnetoresistive bodies 22 and 24. For instance, switch SW1A of the black mask image switching means 36 is connected to a point situated directly above (i.e., perpendicularly above) the point along the bottom surface 68 of the magnetoresistive body 22 to which the switch SW1C of the black sensed image switching means is connected. This is true for each of the points along the top and bottom surfaces 66 and 68 of the black image magnetoresistive body as well all the points along the white image magnetoresistive body.

For example, switch SW1B of the white mask image switching means 38 is connected to a point along the top surface 66 of the white image magnetoresistive body 24 while switch SW1D of the white sensed image switching means 42 is connected to a point along the bottom surface 68 of the same body 24 which is situated directly therebelow.

As shown in FIG. 2B, line L1 is connected to the positive pole of a source of electricity V1 while line L2 is connected to the negative pole of the same source. Furthermore, it can be seen that in order to form a complete circuit, current must flow through line L1, through lines LA1–LA9, through the black mask image switching means 36, through lines LAA1–LAA9, through the black image body 22, through lines LCC1–LCC9, through the black sensed image switching means 40, through lines LCA1–LCA9 to line L2 or from line L1 through lines LB1-LB9, through the white mask image switching means 38, through the lines LBB1-LBB9, through the white image block 24, through lines LDD1-LDD9, through the white sensed image switching means 42, through lines LD1-LD9, to line L2. Thus, the total current flowing from source V1 is equal to the current flowing through the black image body 22 plus the current flowing through the white image body 24.

At this point the principle of magnetoresistance and how it relates to the instant invention shall be discussed. Magnetoresistance stands for the principle that the resistance through a material when exposed to a magnetic field is greater along a path parallel to the magnetic field to which it is exposed than it is along a path transverse to that same magnetic field. Although with many materials the electrical resistance perpendicular to the magnetic field is at most only slightly greater than the electrical resistance parallel to the magnetic field, it has been found that with certain metals (e.g., Bismuth, Anitmony and Arsenic) this difference is quite pronounced.

Consequently, in the preferred embodiment of the instant invention the magnetoresistive bodies 22 and 24 are constructed from the metal Bismuth. It has been found that the electrical resistance perpendicular to the magnetic field across a body of Bismuth can become as much as 300 times greater than the electrical resistance along a path parallel to the magnetic field. In order to obtain optimal results, the intensity of the magnetic field to which these bodies are exposed should be 10 kilogauss or greater.

In addition, it should be emphasized that the electrical resistance along a path through a magnetoresistive material increases gradually as the path is rotated from a position of being parallel to the magnetic field to a position where the path is perpendicular thereto. Thus, the electrical resistance through a nearly parallel path is only slightly greater than the electrical resistance along the parallel path, while the electrical resistance along a nearly perpendicular path is only slightly less than the electrical resistance along a perpendicular path.

For this reason, a magnetoresistive body of material is often analogized to a bundle of electrical wire having leaky insulation. Although electrical current is capable of flowing transverse to the individual strands of wire, it flows best along a path which is parallel thereto.

Figure 5:
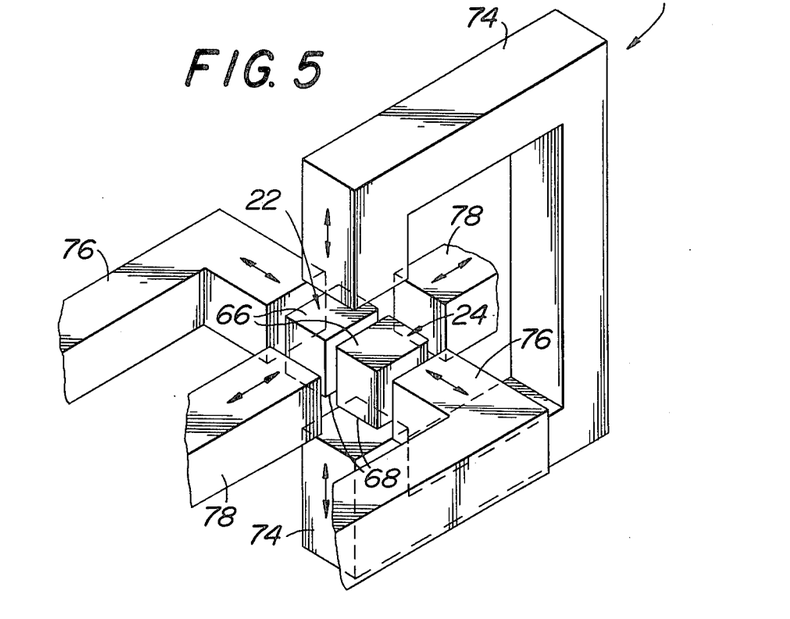
FIG. 5 is a perspective view of magnetoresistive bodies and associated magnetic means used in the system.

As shown in FIGS. 2B and 5, each body 22 and 24 is constructed as a solid block of Bismuth with each body containing a top surface 66 and a bottom surface 68 which are parallel to each other and also parallel to the corresponding top and bottom surfaces 66 and 68, of the other body.

Although in the preferred embodiment of the invention the top surfaces 66 and the bottom surfaces 68 of the bodies 22 and 24, respectively, are parallel to each other, in various alternative embodiments of the invention, these surfaces can be constructed to be of other geometric shapes (e.g., concentric sections of a sphere).

Assuming that the direction of the magnetic field is perpendicular to the top and bottom surfaces 66 and 68, it can readily be appreciated that current flowing from switch SW1A or switch SW1B to the top surface of either magnetoresistive body 22 or 24 respectively encounters the least amount of resistance through the particular body along a path directed toward the point on the body's bottom surface 68 to which switch SW1C or SW1D, respectively, is connected. With the magnetic field so directed, it should further be appreciated that current flowing through switch SW1A or SW1B to its point of connection along the top surface 66 of either body 22 or 24 also flows through the respective body in a direction transverse to the magnetic field toward a bottom surface 68 point which is connected to a switch other than switch SW1C or SW1D (e.g., to the point along the bottom surface 68 to which switch SW5C or SW5D is connected). However, current flowing along this path encounters a substantially greater amount of electrical resistance and as a result, if this second path were the only path to be taken by the electrical current flowing between lines L1 and L2, the amount of current flowing therebetween would be substantially less than the amount of current flowing had the only path been the path between switch SW1A or SW1B of the top surface and switch SW1C or SW1D respectively, of the bottom surface.

Thus, it can be said that whenever the direction of the magnetic field is perpendicular to the top and bottom surfaces 66 and 68 respectively, a point connected to switch SW1A or SW1B along the top surface corresponds to a point connected to switch SW1C or SW1D, respectively, along the bottom surface 68. This is true for every other point connected to switch SW1-SW9 (A, B, C or D), as well.

Thus, a maximum amount of current flows through a particular body when there is a maximum number of matching top surface 66 and bottom surface 68 points corresponding to the mask image and sensed image features of that body. Furthermore, a maximum amount of combined or total current flows through the two bodies 22 and 24 and also flows through the indicator means 44 when a maximum total number of matching black features (sensed with mask) plus white features (sensed with mask) are being represented on the two bodies.

However, when the direction of the magnetic field is shifted to be at an angle other than 90° relative to the top and bottom surfaces 66 and 68 of the body 22, corresponding points are no longer situated to be above and below one another. Therefore, a maximum amount of current flows through the body 22 when the points along the top surface 66 which are electrically connected through switching means 36 to line L1 correspond to points along the bottom surface 68 which are electrically connected to the line L2 which are not at a 90° angle relative to one another, but are at an angle equal to the angle of the magnetic field, as measured relative to the top and bottom surfaces 66 and 68.

Likewise, the same holds true for the second (white image) body 24 as well. Since the second body 24 is situated to be parallel to the first body 22 and therefore, the angle to which the magnetic field is directed towards the second body 24 is the same as the angle to which it is directed towards the first body 22, corresponding top and bottom positions along the second body 24 also correspond to corresponding positions along the top and bottom surfaces 66 and 68 of the first body 22.

As a result of the foregoing, by shifting the magnetic field, a maximum current flow can be attained where the sensed image 50 and the mask image 52 are not aligned but are represented at different positions along their respective surfaces 68 and 66 respectively, assuming they otherwise match.

In effect, the shifting of the magnetic field to maximize the current flowing through the two bodies is analogous to continually re-positioning a template in order to obtain the best possible match between the template and a sensed image.

By utilizing a shifting magnetic field the instant invention obviates the need for either mechanically shifting a template through a visual field or for performing complex, time consuming mathematical computations in order to repeatedly mathematically transform the top and bottom positions to determine whether a match can be made between the sensed image and the mask image.

As mentioned above, where there is an exact match between the two images there is a resulting exact match between the black sensed image features and black mask image features as well as an exact match between the white sensed image features and the white mask image features. As a result, in the preferred embodiment of the device 20, the white image body 24, the white mask image switching means 38 and the white sensed image switching means 42 are electrically connected between lines L1 and L2 in parallel with the black image body 22, the black mask image switching means 36 and the black sensed image switching means 40.

As a result, the total current flowing through the indicator means 44 is equal to the combined current flowing through the black image body 22 and the white image body 24.

The magnetic field producing means 30 as shown in FIG. 5 comprises 3 orthogonally directed magnets.

As shown in FIG. 5, the two bodies 22 and 24 are situated alongside and parallel to each other in order that they may be exposed to the same magnetic field and at precisely the same angle.

The preferred embodiment of the instant invention entails a permanent magnet 74 and two electromagnets 76 and 78, respectively, thus enabling the direction of the magnetic field to be shifted in two directions (the X and Y direction) by varying the relative intensity of the component parts of the overall magnetic field being produced by the respective electromagnets 76 and 78. As shown in FIG. 5, electromagnet 76 is oriented to produce a field parallel to the X direction relative to the top and bottom surfaces 66 and 68 of the magnetoresistive bodies 22 and 24, electromagnet 78 is oriented to produce a magnetic field parallel to the Y direction relative to these top and bottom surfaces and permanent magnet 74 produces a magnetic field directed perpendicular to these surfaces.

It should readily be appreciated from FIG. 5, that the direction of the magnetic field through the bodies 22 or 24 may readily be changed in both an X and in a Y direction by changing the intensity of the magnetic field being produced by magnets 76 and 78, respectively.

Shifting of the magnetic field is accomplished by varying the amount of electrical current being supplied to each of the two respective electromagnets 76 and 78. The control means 46 controls the amount of current being supplied to the respective electromagnets 76 and 78 responsive to the amount of current flowing through the two bodies 22 and 24.

To that end, the control means 46, by varying the amount of current being supplied to the respective electromagnets, functions to shift the direction of the magnetic field to a position where there is a maximum amount of current flowing through the two bodies 22 and 24 and thus, across the indicator means 44, as well.

The circuitry of the control means 44 (not shown) can include any number of either digital or analog devices suitable for varying the direction of the magnetic field in order to maximize the electrical current flowing through the two bodies 22 and 24. A digital volt meter and a two-dimensional, step-wise improvement optimizer are two examples of devices which may be utilized to accomplish such a result.

As shown in FIG. 1, the indicator means 44 is connected to line L1. Thus, the total current flowing to the two bodies 22 and 24 must flow through the indicator means 44.

In that regard, once the magnetic field has been rotated to produce a maximum current flow, the indicator means determines whether this amount of current is sufficiently high to warrant a signal indicating a match. Since the maximum amount of current which flows through the bodies 22 and 24 is partially dependent upon the angle of the magnetic field, the indicator means 44 takes this factor into account in determining whether a match has occured. To that end, the indicator means in a practical embodiment of the invention receives a feedback signal from the control means 46 so that the indicator means may properly be calibrated for the particular angle in effect at that time.

The electrical circuit making up the indicator means is shown in FIG. 4 and basically comprises a discriminator DR 10, having three input pins and one output pin. The first input pin of the discriminator DR 10 is connected to the junction between a resistor R1 and line L1, the second input is connected to the center tap connection of a potentiometer P3 and the third input is connected to a line L3. The potentiometer P3 is connected at one end to the positive pole of a biasing voltage source such as a battery V2 and at its other end to the line L3. The negative pole of the voltage source V2 is connected to the junction between the other side of resistor R1 and line L3. The third input of discriminator DR 10 is connected to line L3. Connected at the junction of resistor R1 and line L3 is a resistor R2. A second side of resistor R2 is connected to the positive pole of the device's primary voltage source V1. The control means 46 is to be connected across resistor R2.

The discriminator DR 10 is designed such that whenever the input voltage between Line L1 and line L3 is greater than the reference voltage between the center tap of Potentiometer P3 and line L3, the discriminator DR 10 produces an output signal to indicate a match.

Conversely, when the input voltage between line L2 and line L3 is less than the reference voltage between the center tap of the Potentiometer P3 and line L3, the output signal produced by discriminator DR 10 indicates the occurence of a non-match. As should be appreciated from FIG. 4, the degree of similarity necessary in order to obtain a signal indicating a match may readily be adjusted by the threshold voltage setting of Potentiometer P3.

In a practical embodiment of the invention, the output signal of discriminator DR 10 serves as a means for actuating an electronic or electromechanical switch or device, thus enabling the device 20 to readily produce any number of electrical or electromechanical responses whenever a matching image is sensed.

Figure 3:
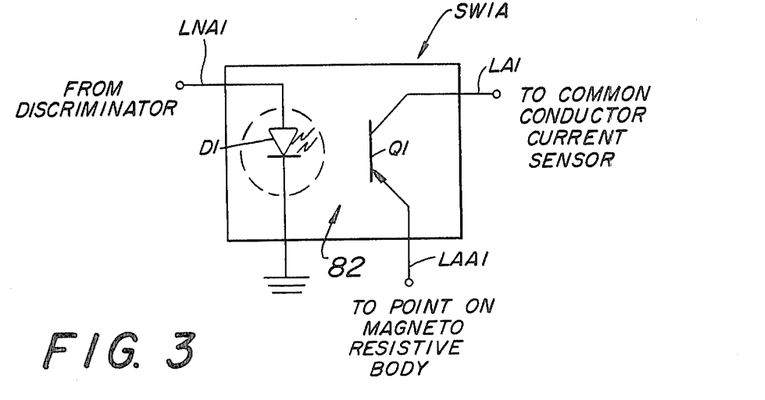
FIG. 3 is a schematic diagram of a switching circuit used in the system.

The circuitry comprising switch SW1A (which is identical to the circuitry of switches SW1-9 A, B, C or D of the switching means 36, 38, 40 and 42) is shown in detail in FIG. 3. As can be seen, the switch SW1A is constructed as an optical islolator 82. As is known, an optical isolator includes a light diode D1 which is optically coupled to a light sensitive transistor Q1. The anode of the diode D1 is connected by line LNA1 to the discriminator means 32 and its cathode is connected to a common ground. Whenever a "1" state signal is received by the diode D1 from the discriminator DRA1, the diode D1 emits light which in turn triggers the optically coupled transistor Q1 into conduction by forming a closed circuit between its emitter and collector. The diode D1 thus operates as a gate. The collector of transistor Q1 which operates as one output pole of the switch is connected by line LA1 to the common conductor L1. The emitter of transistor Q1 of switch SW1A operates as a second output pole and is connected to a point along the magnetoresistive body 22 by a line LAA1 (as discussed above).

It should be appreciated that every other switch SW1-SW9 (A, B, C or D) is also connected to its respective common conductor L1 or L2, to a particular point along body 22 or 24 and to its respective discriminator means 32 or 24, as is switch SW1A.

An alternative embodiment of the invention entails eliminating the mask image sensing means 26 and the mask image discriminator means 32. This is accomplished by introducing a plurality of "0" and "1" state electrical signals directly to the mask image switching means 36 and 38 to produce the same pattern of open and closed switches that would be produced by a particular mask image template.

It should also be appreciated that a minimum amount of current results where the sensed image and the mask image are negatives (i.e., are complete opposites) of each other. To that end, another alternative embodiment of the invention comprises means for comparing the negative of a first image with a second image along with control means and indicator means arranged to minimize the current through the device and indicate a match, respectively, when the two images are negatives of each other.

Still another alternative embodiment of the invention utilizes means for producing a non-uniform (e.g., diverging or converging magnetic field). Through the utilization of the principle of magnetoresistance in combination with a diverging or converging magnetic field, the device 20 is able to compare a mask image with an externally sensed image which is either larger or smaller than the mask image. This result is achieved due to the fact that the paths of least electrical resistance between the top and bottom surfaces 66 and 68 of the respective bodies would either diverge or converge rather than run parallel to one another, as they otherwise do. Thus, a given mask image along the top surface 66 will correspond to either a larger or smaller sensed image represented along the bottom surface 68.

Furthermore, by changing the position of the focal point of the non-uniform magnetic field, the size ratio between the mask image and the sensed image could be varied, as desired. To that end, it may be desirable to employ means for continually varying the size ratio between the mask image and the object being searched for in order to search for a similarly shaped external object of any size.

As should be appreciated from the foregoing, the device 20, although only exemplary of an image correlation device which could be constructed utilizing the principle of magentoresistance, nonetheless clearly demonstrates the capabilities and general constructional details of such a device.

The device 20 permits an almost instantaneous shifting of images being compared to occur and could readily be adapted for use in comparing images of different dimension.

Without further elaboration, the foregoing will so fully illustrate my invention that others may, be applying current or future knowledge, readily adapt the same for use under various conditions of service.

I claim:

1. An electronic image correlation device comprising a magnetoresistive body having a first surface and a second surface such that when said body is exposed to a magnetic field the electrical resistance through said body is substantially greater in a direction transverse to said magnetic field than in a direction parallel to said magnetic field, means for producing and exposing said body to a magnetic field, means for selectively engaging and supplying electric current to a plurality of points on said first surface corresponding to a particular first image, means for selectively engaging and conducting electric current from a plurality of points on said second surface of said body to complete an electrical path with the number and location of said points along said second surface corresponding to a second image, with the total current flowing through said body and said path being dependent upon the number of electrically engaged points on said first surface which are situated to have a correspondingly located engaged point on said second surface and indicator means which is responsive to the amount of current flowing through said body and said path.

2. The device of claim 1, further comprising a second magnetoresistive body also having a first surface and a second surface, said surfaces are exposed to a magnetic field at the same angle as are said first and said second surfaces of said first body, said second body functions in a manner similar to the manner in which said first body functions with each non-engaged first surface point along said first body having a corresponding engaged first surface point along said second body and each non-engaged second surface point along said first body having a corresponding engaged second surface point along said second surface of said second body such that the current flowing through said second body is dependent upon the number electrically engaged points along said first surface of said second body which are situated to have correspondingly located engaged points along said second surface of said second body.

3. The device of claim 2, wherein said magnetoresistive bodies are of three-dimensional construction and said first and said second surfaces are parallel to each other.

4. The device of claim 3, wherein said bodies are constructed of Bismuth.

5. The device of claim 2, wherein the current flowing through each body combines to form a single combined current which is greatest where there is the greatest degree of similarity between said first image and said second image.

6. The device of claim 2, further comprising means for enabling said device to scan a visual field in order to determine whether a first image and a second image are similar even where they are not aligned with each other within their respective visual fields.

7. The device of claim 6, wherein said scanning means comprises means responsive to the amount of combined current passing through said first and said second bodies for varying the direction of said magnetic field in order to maximize said current.

8. The device of claim 7, wherein said means for varying the direction of said magnetic field comprises a plurality of electromagnets which are oriented in different directions such that the direction of the overall magnetic field may be varied by varying the relative intensity of the respective magnetic fields being produced by said individual electromagnets.

9. The device of claim 1, further comprising a plurality of photoelements and a plurality switching means, each of said points being electrically connected to a particular switching means which in turn is connected to a particular photoelement such that a particular point becomes electrically engaged when the switching means to which it is connected receives a signal indicating that the photoelement to which that switching means is connected has sensed a particular image.

10. The device of claim 9, further comprising discriminator means, wherein said signal is produced by a particular discriminator means responsive to another signal being produced by a particular photoelement.

11. The device of claim 2, wherein the current flowing through each of said bodies combines to form a single combined current which is least where the degree of antisymmetry between said first image and said second image is greatest.

* * * * *